US007486682B2

(12) United States Patent
Nuzman et al.

(10) Patent No.: US 7,486,682 B2
(45) Date of Patent: Feb. 3, 2009

(54) METHOD AND APPARATUS FOR GROOMING TRAFFIC DEMANDS ACCORDING TO MILEAGE BASED TARIFFS

(75) Inventors: Carl Jeremy Nuzman, Union, NJ (US); Gordon Thomas Wilfong, Bedminster, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 755 days.

(21) Appl. No.: 10/903,546

(22) Filed: Jul. 30, 2004

(65) Prior Publication Data

US 2006/0034293 A1     Feb. 16, 2006

(51) Int. Cl.
*H04L 12/28* (2006.01)
(52) U.S. Cl. .................... 370/395.41; 370/255
(58) Field of Classification Search .......... None
See application file for complete search history.

(56) References Cited

U.S. PATENT DOCUMENTS

| 6,215,771 | B1 * | 4/2001 | Turner et al. ............. 370/235 |
| 2003/0023412 | A1 * | 1/2003 | Rappaport et al. ............. 703/1 |

OTHER PUBLICATIONS

Dynamic traffic grooming in WDM mesh networks using a novel graph model Hongyue Zhu; Hui Zang; Keyao Zhu; Mukherjee, B.; Global Telecommunications Conference, 2002. Globecom '02. IEEE vol. 3, Nov. 17-21, 2002 pp. 2681-2685 vol. 3.*

A comprehensive study on next-generation optical grooming switches Keyao Zhu; Hui Zang; Mukherjee, B.; Selected Areas in Communications, IEEE Journal on vol. 21, Issue 7, Sep. 2003 pp. 1173-1186.*

Awerbuch, B., et al., "Buy-at-Bulk Network Design", *Proceedings of FOCS*, (1997), pp. 542-547.

Modiano, E., et al., "Traffic Grooming in WDM Networks", *IEEE Communications Magazine*, (Jul. 2001), pp. 124-129.

Mansour, Y., et al., "An Approximation Algorithm for Minimum-Cost Network Design", *Faculty of Mathematical Sciences CS94-22, Weizmann Institute of Science*, (Dec. 29, 1998).

Salman, F., et al., "Buy-at-Bulk Network Design: Approximating the Single-Sink Edge Installation Problem", *Proceedings of SODA*, (1997), pp. 619-628.

Fortune, S., "Voronoi Diagrams and Delaunay Triangulations", *Euclidean Geometry and Computers*, World Scientific Publishing Co., (1992), pp. 193-233.

* cited by examiner

*Primary Examiner*—Edan Orgad
*Assistant Examiner*—Sori A Aga
(74) *Attorney, Agent, or Firm*—Kenneth M. Brown

(57) ABSTRACT

A method and apparatus for grooming traffic demands according to mileage based tariffs. An Integer Linear Program (ILP) that captures the traffic grooming problem is defined, and such a linear program can in principle be solved by conventional linear program application systems which are fully familiar to those of ordinary skill in the art. However, the time required to solve such an ILP is fairly large, even for the moderately sized networks we are interested in. That is, there are many possible routes to consider, and hence many integer variables in the ILP. Therefore, further in accordance with the principles of the present invention, the ILP is advantageously run on the Delaunay Triangulation of the network rather than on the completely connected network graph.

18 Claims, 1 Drawing Sheet

METHOD AND APPARATUS FOR GROOMING TRAFFIC DEMANDS ACCORDING TO MILEAGE BASED TARIFFS

FIELD OF THE INVENTION

The present invention relates generally to communications network management and more particularly to a method and apparatus for performing "traffic grooming" (i.e., the bundling of lower bandwidth demands into higher bandwidth channels or "pipes") of demands in accordance with mileage based tariffs.

BACKGROUND OF THE INVENTION

A "network," as will be used herein, is a collection of nodes with (undirected) links between various node pairs. A "demand" of bandwidth b between a pair of nodes u and v can be thought of as a request for a reservation of bandwidth b along each link in some route between u and v. Then, as is well known to those of ordinary skill in the art, the goal of "traffic grooming" is to determine how to route each demand so as to best be able to bundle up lower bandwidth demands along a link into higher bandwidth "pipes" (i.e., channels).

Typically there are a number of different sized bandwidth pipes available, each with an associated per mile cost. The costs are typically such that the cost per unit of bandwidth per mile is cheaper on a larger bandwidth pipe. Thus, if there are sufficiently many demands routed along a given link, it will usually be cheaper to reserve a large bandwidth pipe to handle them, rather than using a large number of smaller bandwidth pipes.

Often there is an underlying physical network over which the demands must be routed. We will assume herein however that every location is directly connected to every other location. Then, the distance between two locations (i.e., nodes) is simply the Euclidean distance between them. Since the grooming problem is essentially choosing the best paths along which to route the demands, the problem clearly becomes more difficult as the number of possible paths to choose from increases. In particular, the number of simple paths (i.e., paths without cycles) between a given pair of nodes in the completely connected network case we address is exponential. Even if we restrict the number of links in a path to, for example, a number k, in a network with n nodes there are $O(n^k)$ possible paths to be considered. That is, the grooming problem can become very complex due to the large number of choices for routing each demand.

A summary of the problem being addressed herein then is as follows:

Assume that we are given demands of various bandwidths between pairs of nodes. For example, for each pair of locations, say A and B, we are given the number of DS1 (low bandwidth) circuits required between A and B and the number of DS3 (high bandwidth) circuits desired between A and B. (DS1 and DS3 circuits are fully familiar to those of ordinary skill in the art.) Since higher bandwidth pipes are typically cheaper per unit capacity per mile, the problem is to find the best (e.g., optimal) way to route these demands in order to be able to efficiently pack them into high bandwidth pipes to thereby reduce (e.g., minimize) the total cost of reserving pipes to accommodate these routings.

One simple example is as follows:

Suppose we have locations $A_1, A_2, \ldots, A_n$ on the East Coast and locations $B_1, B_2, \ldots, B_n$ on the West coast, and there is a single demand (of some bandwidth x) between each pair of locations $A_i$ and $B_j$, for $1 \leq i \leq n$. Now suppose that the cost of connecting nodes with a "Type I" pipe having bandwidth x is a dollars per mile and that the distance between $A_i$ and $B_i$ is 4000 miles for $1 \leq i \leq n$. Consider now a "Type II" pipe which has higher bandwidth y=nx and which costs b dollars per mile, where b is (typically) significantly smaller than na, due to economies of scale. Suppose the distance between $A_1$ and all other $A_i$ is 10 miles and, similarly, the distance from $B_1$ to all other $B_i$ is 10 miles. Then, the straightforward solution of putting a "Type I" pipe between each $A_i$ and $B_i$, $1 \leq i \leq n$, costs a total of 4000na dollars. However, we could instead connect each $A_i$, i>1, to $A_1$ and each $B_i$, i>1, to $B_1$ with a "Type I" pipe for a total cost of 20(n−1)a dollars, while we connect $A_1$ to $B_1$ with a "Type II" pipe for a cost of 4000b dollars. Thus, this alternate solution would have a total cost of 20(n−1)a+4000b dollars. So, if b is in fact significantly smaller than na this alternate solution would clearly be cheaper. The problem of reducing (e.g., minimizing) the cost of such a network is sometimes referred to as the "buy-at-bulk" problem.

(Note that in contrast to much of the buy-at-bulk literature, however, we are particularly interested here in fully connected graphs. The reason is that we are particularly motivated by the problem of purchasing bandwidth over a communications network from a communications service provider. Although the physical network operated by the service provider may have an arbitrary topology, the service provider will typically present to the customer a fully connected virtual network in which bandwidth may be purchased between any pair of nodes.)

As pointed out above, the traffic grooming problem can become very complex due to the large number of choices for routing each demand. Therefore, it would be highly desirable to have an efficient method for grooming traffic demands according to mileage based tariffs.

SUMMARY OF THE INVENTION

In accordance with the principles of the present invention, an efficient method and apparatus is provided for grooming traffic demands according to mileage based tariffs. In particular, an Integer Linear Program (ILP) that captures the above described traffic grooming problem may be defined, and such a linear program can in principle be solved by conventional linear program application systems which are fully familiar to those of ordinary skill in the art. However, the time required to solve such an ILP is fairly large, even for the moderately sized networks we are interested in. That is, there are many possible routes to consider, and hence many integer variables in the ILP. Therefore, in accordance with the principles of the present invention, the ILP is advantageously run on a simplified (i.e., sparse) version of the graph of the original network rather than on the completely connected network graph. In accordance with the preferred embodiments of the present invention, the simplified version of the original graph comprises a Delaunay Triangulation (DT) thereof.

As is well known to those skilled in the art, the Delaunay Triangulation (DT) is a sparse sub-graph of the completely connected graph which has the desirable property that for every pair of nodes, the distance between the nodes in the DT is guaranteed to be close to the straight line Euclidean distance between the nodes. Thus, while using the DT of the network rather than the completely connected network graph greatly reduces the number of paths under consideration, advantageously, the length of the shortest paths are only modestly affected.

Thus, in accordance with an illustrative embodiment of the present invention, a Delaunay Triangulation (DT) of the original network graph is computed; an Integer Linear Program (ILP) is generated based on the DT and on a set of demands, edge distances and costs/mile for each of a plurality of pipe types; and the generated Integer Linear Program (ILP) is solved to produce a number of each pipe type along each edge of the network.

DETAILED DESCRIPTION

Figure 1:
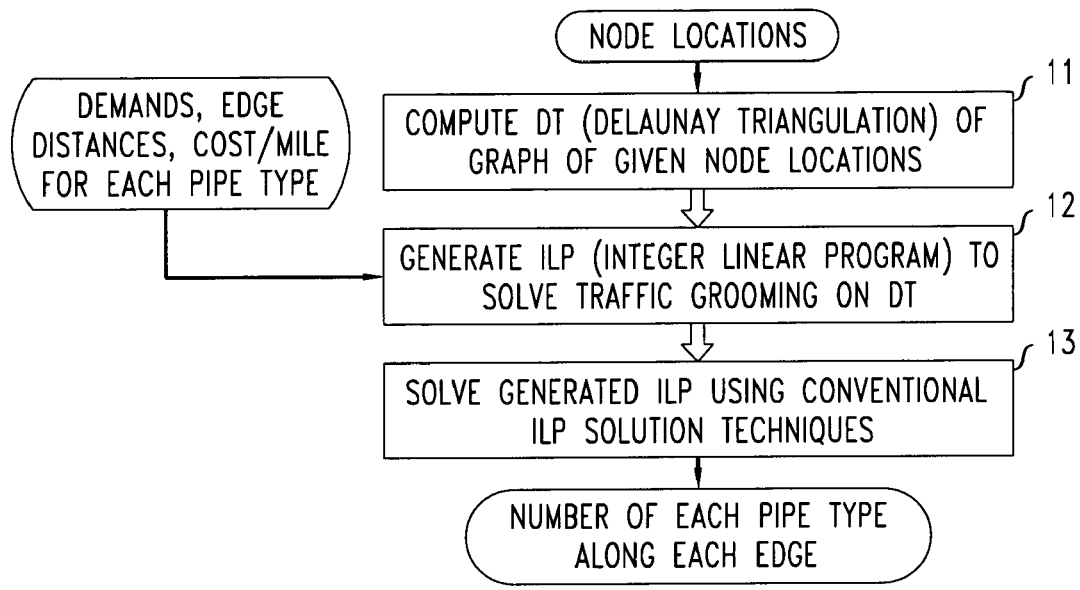
FIG. 1 shows a flowchart of a procedure for grooming traffic demands according to mileage based tariffs in accordance with a first illustrative embodiment of the present invention.

FIG. 1 shows a flowchart of a procedure for grooming traffic demands according to mileage based tariffs in accordance with a first illustrative embodiment of the present invention. The illustrative embodiment of FIG. 1 takes as input a set of nodes (representing a completely connected network graph) along with a set of demands, edge distances and costs per mile for each of a plurality of types of pipes. The result of the illustrative procedure is a number of each pipe type along each edge.

Specifically, as shown in block 11 of the flowchart of FIG. 1, a Delaunay Triangulation (DT) of the original network graph (i.e., the input set of nodes) is computed. Then, in block 12 of the flowchart, an ILP (Integer Linear Program) is generated based on the generated DT and also based on the set of demands, edge distances and costs per mile for each of a plurality of types of pipes. Finally, in block 13 of the flowchart, the generated ILP is solved with use of conventional linear programming solution tools (such as, for example, CPLEX, fully familiar to those skilled in the art).

We now describe one exemplary Integer Linear Program (ILP) which may be advantageously used in accordance with one illustrative embodiment of the present invention to find a minimum cost solution. The input to the ILP comprises (i) a graph $G=(V,E)$, where V comprises a set of vertices (i.e., nodes) and E comprises a set of edges interconnecting the nodes; (ii) a mileage (i.e., distance) between nodes i and j for each edge $ij \in E$; (iii) a cost per mile for each of a plurality of connection types (e.g., DS1 or DS3 lines); and (iv) a set of requests for connection types between pairs of nodes.

From the above described input we define the following parameters: First, we define demand($\{s,d\}$,t) to be the number of demands for a connection of type t between nodes s and d. The parameter cost(i,j,t) is the cost of a type t connection between nodes i and j where ij is an edge in the graph—that is, cost(i,j,t) is the product of the mileage of edge ij and the cost per mile of a type t connection. Next, note that for each pair of nodes s and d, we have a set of paths PATHS(s,d) of all simple (i.e., node disjoint) paths between s and d. Then, we next define the set PATHS=$Y_{s,d \in V}$PATHS(s,d). Also, for each edge $ij \in E$, we have a set of paths EDGE_IN_PATHS(i,j) of all paths in PATHS that contain the edge ij.

In accordance with the principles of the present invention, the goal is to install a minimum cost (or close to minimum cost) set of "pipes" along the edges of G that suffice to route all of the demands through. Just like demands, pipes have types that define their capacity. Thus, for example, we might decide to install 4 DS1 pipes and 2 DS3 pipes on edge ij. We therefore define variable pipes(i,j,t) to represent the number of pipes of type t installed on edge ij. For simplicity, we will assume herein that the size of a type t pipe (or demand) is some multiple $m_t$ of the size of the smallest type of pipe. Then for each edge $ij \in E$, the total capacity of all the pipes installed on edge ij will be given by $$\text{capacity}(i, j) = \sum_t (m_t * \text{pipes}(i, j, t)).$$

For each path $p \in$ PATHS and demand type t we have a variable flow(p,t) that represents how many of the demands of type t between the end points of p are routed along p. Let ends(p) denote the set $\{s,d\}$ if p is a path between s and d. Then the total amount of demands routed between the endpoints s and d on some path p where ends(p)=$\{s,d\}$ is given by:

$$\text{total\_flow}(p) = \sum_t (m_t * \text{flow}(p, t)).$$

Thus the ILP is advantageously used to find values for the variables flow(p,t) and pipes(i,j,t) to minimize:

$$\sum_{i,j,t} \text{cost}(i, j, t) * \text{pipes}(i, j, t) \qquad (1)$$

subject to the constraints:

for each pair of nodes $s$ and $d$, $\qquad (2)$ $$\sum_{\substack{t \\ p \in \text{PATHS}(s,d)}} \text{flow}(p, t) = \text{demand}(\{s, d\}, t)$$

and for each edge $ij \in E$, $\sum_{p \in \text{EDGE\_IN\_PATHS}(i,j)} \text{total\_flow}(p) \leq \text{capacity}(i, j) \qquad (3)$ Thus we wish to minimize Equation (1) subject to the constraint of Equation (2) which ensures that all demands are routed and the constraint of Equation (3) which ensures that sufficient capacity is installed on each edge to handle the demands as routed.

As described above, however, in accordance with the illustrative embodiment of the present invention it is advantageous to use the Delaunay Triangulation (DT) for the graph G in the optimization rather than using the completely connected graph. In particular, a graph that approximately preserves distances provides an alternative to using the completely connected graph—use of the DT provides a particularly advantageous one as a result of the fact that it is particularly sparse. This can be seen by examining the ILP described above. More specifically, note that the ILP has variables such as, for example, flow(p,t), that are parameterized by p. Thus, it can be easily seen that the number of such variables grows proportionately to the number of paths in PATHS and that the number of such paths is exponential in the number of edges in G. Since it is well known that solving an ILP can become quite complex for such a large number of variables it is highly advantageous to minimize their number. Therefore, using a graph G with as few edges as possible is quite helpful.

For the same reason, in accordance with certain illustrative embodiments of the present invention, the number of eligible paths may be advantageously reduced further by limiting such paths to those that consist of no more than some fixed constant number, k, of edges. (Illustratively, k may be set to 4.) Thus, in accordance with such illustrative embodiments of the invention, the above described ILP is advantageously simplified by only allowing routes that go through at most k other nodes.

Of course, the DT is not necessarily compatible with such a restriction. That is, there may in general be nodes such that the shortest route between them in the DT goes through more than a fixed number, k, of nodes. Thus, according to certain other illustrative embodiments of the invention, we advantageously augment the DT by adding a small number edges to the DT to ensure that all node pairs can be connected by at most k "hops." (As described below, this augmentation may be accomplished by defining a second, fast-running ILP which is used to identify the edges which are to be added.) Advantageously, the resulting augmented graph is still a very sparse graph and hence the number of possible paths between nodes is limited. Therefore, the initial grooming ILP will still run very quickly when using such an augmented DT graph.

Therefore, as long as the given DT has "diameter" of at most k, where the "diameter" is the maximum, over all node pairs i and j, of the length of the shortest path between i and j, the DT need not be augmented. However, it may be the case that the DT has diameter greater than k. Then, in accordance with certain other illustrative embodiments of the present invention, we not only limit the eligible paths to those that consist of no more than a fixed number, k, of edges, but, in addition, we advantageously augment the edge set of DT so that the resulting graph does, in fact, have diameter at most k. Advantageously, this is done by adding as few edges as possible.

More specifically, in accordance with at least one of these other illustrative embodiments of the present invention, the following augmentation procedure is advantageously performed. First, we define a demand of 1 between each pair of nodes. If an edge e is in the DT then we set cost(e)=0; otherwise we set cost(e)=1. We have variables u(e), where u(e) will be set to 0 if no demand is routed over edge e and to 1 otherwise. Then, we advantageously solve an ILP very similar to the one described above, with the following differences:

(i) We constrain all paths under consideration to be of length at most k;

(ii) there are no pipes variables;

(iii) we replace the capacity constraint of Equation (2) with the constraint that the total flow is zero on any edge with u(e)=0, with the total flow on any other edge being unconstrained; and (iv) rather than minimizing the expression of Equation (1), we minimize the expression:

$$\sum_e (cost(e) * u(e)).$$

Thus, the edges that are advantageously added to the DT are those with cost(e)=1 and u(e)=1.

In summary, then, the steps of an illustrative procedure in accordance with these embodiments of the invention are as follows:

1. Form the DT of a given network (i.e., a fully interconnected set of nodes) on which it is desired to perform traffic grooming.

2. Use an ILP to augment the DT (if necessary) to ensure that all node pairs can be connected by at most than k "hops."

3. Solve the grooming problem, using an ILP which considers all paths of length less than or equal to k in the augmented DT.

Figure 2:
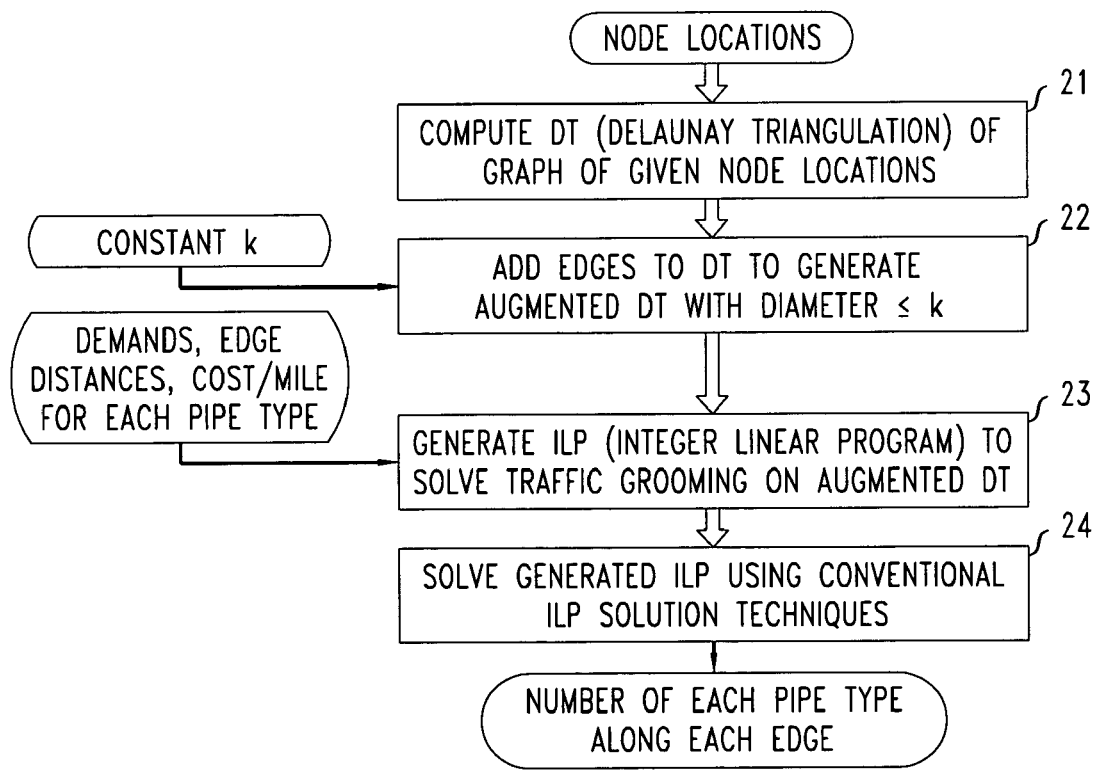
FIG. 2 shows a flowchart of a procedure for grooming traffic demands according to mileage based tariffs in accordance with a second illustrative embodiment of the present invention.

FIG. 2 shows a flowchart of a procedure for grooming traffic demands according to mileage based tariffs in accordance with a second illustrative embodiment of the present invention. In particular, the illustrative embodiment of FIG. 2 limits the path lengths to a fixed integer k, as described above, and moreover, advantageously augments the DT (if necessary) to ensure that all node pairs can in fact be connected by at most than k "hops." Thus, the illustrative embodiment of FIG. 2 takes as input a set of nodes (representing a completely connected network graph) along with a set of demands, edge distances and costs per mile for each of a plurality of types of pipes, as well as an integer k (e.g., 4) which will limit the path lengths to be considered. The result of the illustrative procedure is a number of each pipe type along each edge.

Specifically, as shown in block 21 of the flowchart of FIG. 1, a Delaunay Triangulation (DT) of the original network graph (i.e., the input set of nodes) is computed. Next, however, based on a given integer k (e.g., 4), the DT is augmented to ensure that all node pairs can in fact be connected with at most k "hops." Illustratively, this may be achieved with use of an ILP as described above.

Then, in block 23 of the flowchart, an ILP (Integer Linear Program) is generated based on the augmented DT, and also based on the set of demands, edge distances and costs per mile for each of a plurality of types of pipes, as well as on the value k used in the generation of the augmented DT. Finally, in block 34 of the flowchart, the generated ILP is solved with use of conventional linear programming solution tools (such as, for example, CPLEX, fully familiar to those skilled in the art).

Addendum to the Detailed Description

It should be noted that all of the preceding discussion merely illustrates the general principles of the invention. It will be appreciated that those skilled in the art will be able to devise various other arrangements, which, although not explicitly described or shown herein, embody the principles of the invention, and are included within its spirit and scope. For example, although the illustrative embodiments described herein use the Delaunay Triangulation (DT) of the original (completely connected) graph as the basis of the traffic grooming procedure (i.e., to generate the Integer Linear Program to be solved), it will be obvious to those skilled in the art that other similar "modifications" of the original graph which result in simplified (i.e., sparse) versions thereof may also be used, as long as the distances between nodes are approximately preserved thereby.

Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future—i.e., any elements developed that perform the same function, regardless of structure.

Thus, for example, it will be appreciated by those skilled in the art that any flow charts, flow diagrams, state transition diagrams, pseudocode, and the like represent various processes which may be substantially represented in computer readable medium and so executed by a computer or processor, whether or not such computer or processor is explicitly shown. Thus, the blocks shown, for example, in such flowcharts may be understood as potentially representing physical elements, which may, for example, be expressed in the instant claims as means for specifying particular functions such as are described in the flowchart blocks. Moreover, such flowchart blocks may also be understood as representing physical signals or stored physical data, which may, for example, be comprised in such aforementioned computer readable medium such as disc or semiconductor storage devices. In particular, a computer readable storage medium, as recited in the claims herein, is intended to comprise any data storage medium which may be accessed by a comnuter or a processor, including any computer component, device, or recording media that retains data used for computing for some interval of time. Such a data storage medium may, for example, comprise a memory such as, for example, a RAM (random access memory), a ROM (read-only memory), or a cache memory, or may comprise a mass storage device such as, for example, a magnetic storage device such as a hard disk or a floppy disk, or an optical disk.

We claim:

1. A method for grooming traffic demands to be applied to a communications network having a set of predetermined mileage based tariffs associated therewith, the communications network specified as a set of nodes and a set of edges connecting said nodes, each edge having a distance associated therewith, the method comprising the steps of:
   generating a first graph based on the specified set of nodes and the set of edges;
   generating a second graph based on the first graph, the second graph having a set of edges which are a proper subset of the set of edges of the first graph;
   generating a liner program based on
      (i) the second graph,
      (ii) the set of predetermined mileage based tariffs,
      (iii) the distances associated with each of said edges in said set of edges of said second graph, and
      (iv) a set of traffic demands applied to said communications network;
   solving the generated linear program to groom said traffic demands for application to said communications network; and
   applying the groomed traffic demands to said communications network,
wherein said second graph comprises a Delaunay Triangulation of said first graph.

2. The method of claim 1 wherein said linear program comprises an Integer Linear Program.

3. The method of claim 1 wherein said first graph comprises a completely connected graph of said set of nodes, each pair of said nodes being connected by a corresponding one of said edges in said set of edges.

4. The method of claim 1 wherein said grooming of said traffic demands generated by solving said linear program comprises a number of each of a plurality of pipe types which are to be employed along each edge in said set of edges.

5. The method of claim 1 further comprising the step of adding one or more edges to the second graph such that each pair of nodes in said second graph are connected by a path of at most a fixed number, k, of edges, and wherein said linear program is generated further based on said fixed number, k, of edges.

6. The method of claim 5 wherein said step of adding one or more edges to the second graph comprises generating a second linear program and solving said generated second linear program to identify said one or more edges to be added thereto.

7. An apparatus for grooming traffic demands to be applied to a communications network having a set of predetermined mileage based tariffs associated therewith, the communications network specified as a set of nodes and a set of edges connecting said nodes, each edge having a distance associated therewith, the apparatus comprising a processor adapted to:
   generate a first graph based on the specified set of nodes and the set of edges;
   generate a second graph based on the first graph, the second graph having a set of edges which are a proper subset of the set of edges of the first graph;
   generate a linear program based on
      (i) the second graph,
      (ii) the set of predetermined mileage based tariffs,
      (iii) the distances associated with each of said edges in said set of edges of said second graph, and
      (iv) a set of traffic demands applied to said communications network; and
   solve the generated linear program to groom said traffic demands for application to said communications network; and
   apply the groomed traffic demands to said communications network,
wherein said second graph comprises a Delaunay Triangulation of said first graph.

8. The apparatus of claim 7 wherein said linear program comprises an Integer Linear Program.

9. The apparatus of claim 7 wherein said first graph comprises a completely connected graph of said set of nodes, each pair of said nodes being connected by a corresponding one of said edges in said set of edges.

10. The apparatus of claim 7 wherein said grooming of said traffic demands generated by solving said linear program comprises a number of each of a plurality of pipe types which are to be employed along each edge in said set of edges.

11. The apparatus of claim 1 wherein said processor is further adapted to add one or more edges to the second graph such that each pair of nodes in said second graph are connected by a path of at most a fixed number, k, of edges, and wherein said linear program is generated further based on said fixed number, k, of edges.

12. The apparatus of claim 11 wherein said processor adds one or more edges to the second graph by generating a second linear program and solving said generated second linear program to identify said one or more edges to be added thereto.

13. A computer readable storage medium for use in grooming traffic demands to be applied to a communications network having a set of predetermined mileage based tariffs associated therewith, the communications network specified as a set of nodes and a set of edges connecting said nodes, each edge having a distance associated therewith, the computer readable medium comprising program code executable on a processor for performing a method comprising the steps of:

generating a first graph based on the specified set of nodes and the set of edges;

generating a second graph based on the first graph, the second graph having a set of edges which are a proper subset of the set of edges of the first graph;

generating a linear program based on
(i) the second graph,
(ii) the set of predetermined mileage based tariffs,
(iii) the distances associated with each of said edges in said set of edges of said second graph, and
(iv) a set of traffic demands applied to said communications network; and solving the generated linear program to groom said traffic demands for application to said communications network, wherein said second graph comprises a Delaunay Triangulation of said first graph.

14. The computer readable storage medium of claim 13 wherein said linear program comprises an Integer Linear Program.

15. The computer readable storage medium of claim 13 wherein said first graph comprises a completely connected graph of said set of nodes, each pair of said nodes being connected by a corresponding one of said edges in said set of edges.

16. The computer readable storage medium of claim 13 wherein said grooming of said traffic demands generated by solving said linear program comprises a number of each of a plurality of pipe types which are to be employed along each edge in said set of edges.

17. The computer readable storage medium of claim 13 wherein said method performed by said executable program code further comprises the step of adding one or more edges to the second graph such that each pair of nodes in said second graph are connected by a path of at most a fixed number, k, of edges, and wherein said linear program is generated further based on said fixed number, k, of edges.

18. The computer readable storage medium of claim 17 wherein said step of adding one or more edges to the second graph comprises generating a second linear program and solving said generated second linear program to identify said one or more edges to be added thereto.

* * * * *